United States Patent [19]
Hartman

[11] Patent Number: 5,845,606
[45] Date of Patent: Dec. 8, 1998

[54] PET ANIMAL MOBILITY AID

[76] Inventor: Mary E. Hartman, 678 Woodside Ave., River Vale, N.J. 07675

[21] Appl. No.: 976,542

[22] Filed: Nov. 24, 1997

[51] Int. Cl.$^6$ ..................................................... A01K 15/00
[52] U.S. Cl. .............................................................. 119/856
[58] Field of Search ..................................... 119/769, 771, 119/792, 856, 905, 907

[56] References Cited

U.S. PATENT DOCUMENTS

| D. 330,273 | 10/1992 | Cernek . | |
|---|---|---|---|
| 4,489,677 | 12/1984 | Handley . | |
| 4,530,309 | 7/1985 | Collins . | |
| 4,559,906 | 12/1985 | Smith . | |
| 4,676,198 | 6/1987 | Murray | 119/771 |
| 5,154,660 | 10/1992 | Snyder et al. | 119/771 |
| 5,193,486 | 3/1993 | Kitchens . | |
| 5,305,710 | 4/1994 | Ward, Jr. | 119/771 |
| 5,531,187 | 7/1996 | Ward | 119/856 |

*Primary Examiner*—Thomas Price
*Attorney, Agent, or Firm*—Arthur Jacob

[57] ABSTRACT

A pet animal mobility aid for four-legged pet animals includes central strap extending longitudinally between a forward end and a rearward end for placement along the back of the animal, a forward strap assembly for affixing the forward end of the central strap to the animal adjacent the forelegs of the animal, a rearward strap assembly for affixing the rearward end of the central strap to the animal adjacent the hind legs, the rearward strap assembly including a relatively flexible first rearward strap extending transverse to the central strap and attached to the central strap adjacent the rearward end of the central strap for establishing a first rearward loop extending from the central strap between one of the hind legs and the abdomen of the animal, a relatively flexible second rearward strap extending transverse to the central strap and attached to the central strap adjacent the rearward end of the central strap for establishing a second rearward loop extending from the central strap between the other of the hind legs and the abdomen, and a handle member extending longitudinally along and coupled with at least a rearward portion of the central strap, the rearward portion being located adjacent the rearward end of the central strap and extending along the hind portion of the back of the animal for enabling grasping of the mobility aid along the handle member, adjacent the hind legs of the pet animal, to assist mobility of the pet animal.

18 Claims, 4 Drawing Sheets

US 5,845,606

PET ANIMAL MOBILITY AID

The present invention relates generally to the care and handling of pet animals and pertains, more specifically, to a mobility aid for assisting in the handling of a four-legged animal, such as a dog or a cat, which is somewhat debilitated due to age, disease or injury.

A very wide variety of collars, harnesses and leads are available for the handling of pet animals, such as dogs and cats, and especially for guiding the animal during walking. Fewer devices are available for assisting in the handling of such pet animals which become debilitated and find it more difficult to stand and walk as a result of disease or injury, or age. Among the most common infirmities experienced by pet animals are those which affect the skeletal structure of the animal and, more specifically, the hind portion of the back which is weakened easily by age, disease or injury.

The present invention provides a mobility aid which assists in the handling of pet animals affected by debilitating conditions which impede the ability of the animal to stand and walk. As such, the present invention attains several objects and advantages, some of which are summarized as follows: Provides a simple and highly effective device which is readily fitted onto a pet animal, such as a dog or a cat, having an infirmity which inhibits standing and walking movements for assisting in the handling of the animal; enables the animal to be assisted in standing and walking, with a device of minimal complexity and maximum effectiveness, and with ease of application and removal; provides increased versatility for use with animals having a wide range of sizes and configuration; enables assisted standing and walking without significantly interfering with the natural movements of the animal; provides support where needed most, and especially in the vicinity of the hind portion of the back of the animal, while enabling freedom of movement for maximum effectiveness with comfort and with minimal invasiveness; enables economy of manufacture and ease of maintenance; provides a rugged device readily manufactured of high quality materials for exemplary performance over an extended service life.

The above objects and advantages, as well as further objects and advantages, are attained by the present invention which may be described briefly as a pet animal mobility aid for pet animals having a torso including a longitudinal length, an upper back, and a lower abdomen and having four legs, including two forelegs and two hind legs, the mobility aid comprising: a relatively flexible central strap extending longitudinally between a forward end and a rearward end for placement along the upper back of the torso; a forward strap assembly at the forward end of the central strap for affixing the forward end of the central strap to the torso adjacent the forelegs; a rearward strap assembly for affixing the rearward end of the central strap to the torso along a hind portion of the upper back, adjacent the hind legs, the rearward strap assembly including a relatively flexible first rearward strap extending transverse to the central strap and attached to the central strap adjacent the rearward end of the central strap for establishing a first rearward loop extending from the central strap between one of the hind legs and the abdomen; a relatively flexible second rearward strap extending transverse to the central strap and attached to the central strap adjacent the rearward end of the central strap for establishing a second rearward loop extending from the central strap between the other of the hind legs and the abdomen; and a handle member extending longitudinally along and coupled with at least a rearward portion of the central strap, the rearward portion being located adjacent the rearward end of the central strap, for placement along the hind portion of the upper back to enable grasping of the mobility aid along the handle member, adjacent the hind legs of the pet animal, to assist mobility of the pet animal.

The invention will be understood more fully, while still further objects and advantages will become apparent, in the following detailed description of a preferred embodiment of the invention illustrated in the accompanying drawing, in which.

Figure 1:
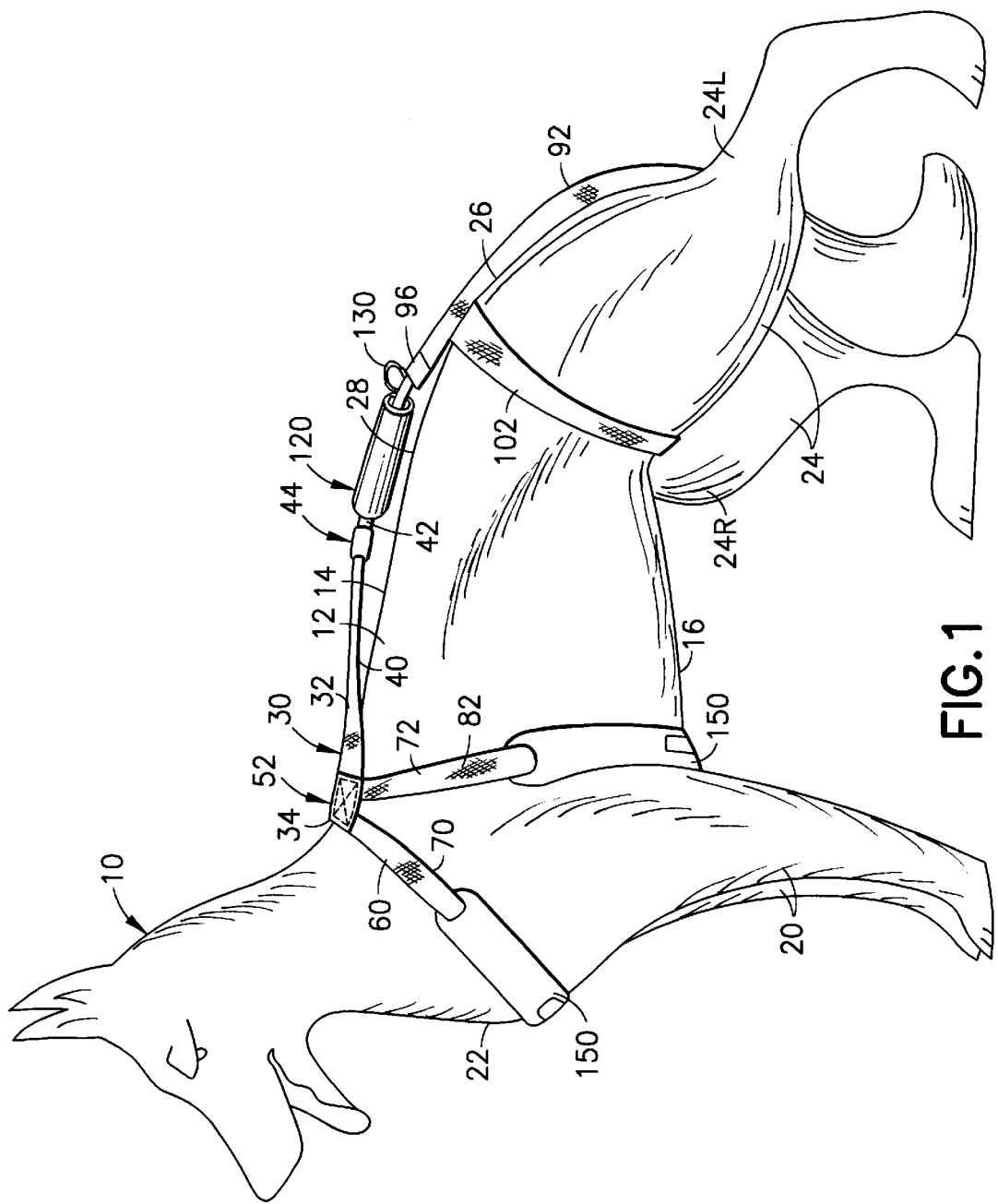
FIG. 1 is a side pictorial view of a pet animal wearing a mobility aid constructed in accordance with the present invention.
Figure 2:
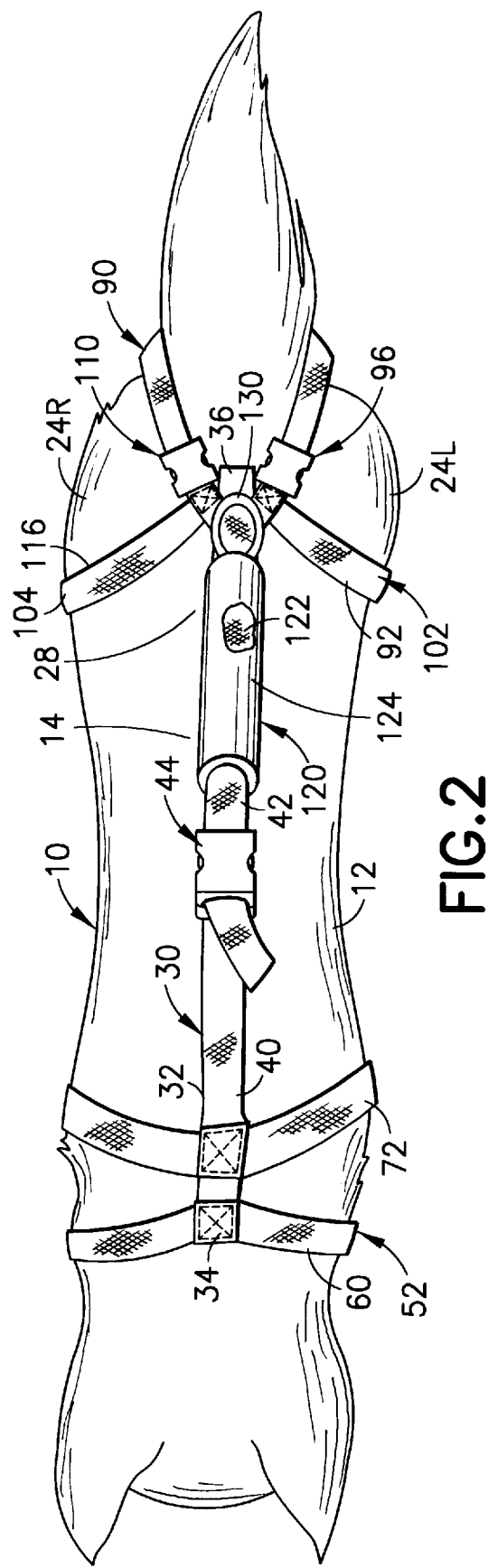
FIG. 2 is a top pictorial view of the pet animal of FIG. 1.

Referring now to the drawing, and especially to FIGS. 1 and 2 thereof, a four-legged pet animal is depicted in the form of a dog 10. Dog 10 has a torso 12, including an upper back 14 and a lower abdomen 16. A pair of forelegs 20 depend from the torso 12 adjacent the forward end 22 of the torso 12, and a pair of hind legs 24 depend from the torso 12 adjacent the rearward end 26 of the torso 12. Dog 10 is debilitated by age which has weakened the upper back 14 adjacent the rearward end 26 of the torso 12, designated as the hind portion 28 of the back 14 of the dog 10, rendering it difficult for the dog 10 to use the hind legs 24 for standing and walking.

Figure 3:
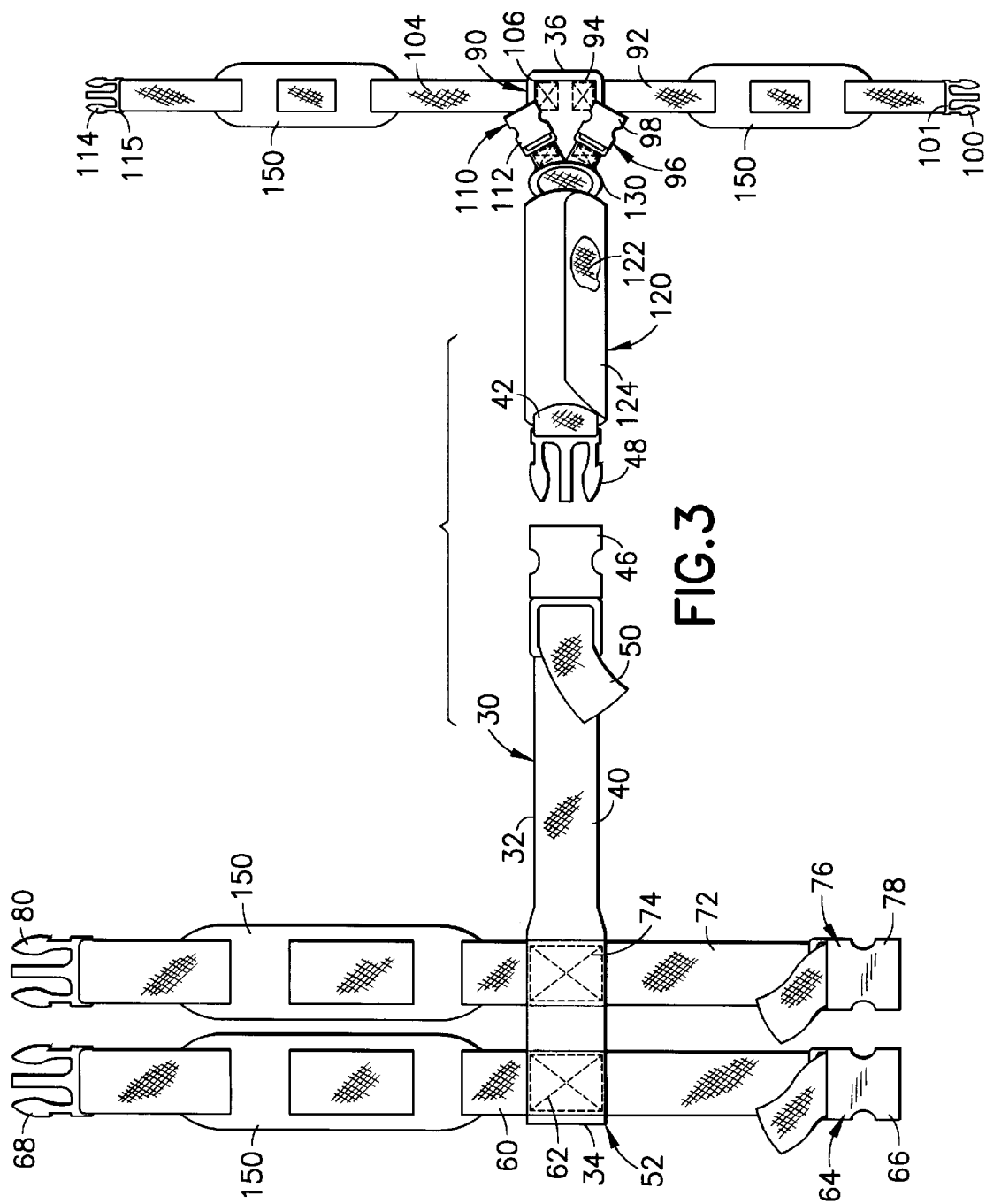
FIG. 3 is a plan view of the pet animal mobility aid.

In order to assist the dog 10 in standing and walking, dog 10 has been fitted with a mobility aid constructed in accordance with the present invention and illustrated generally at 30. As best seen in FIG. 3, as well as in FIGS. 1 and 2, mobility aid 30 includes a central strap 32 which extends longitudinally along a length between a forward end 34 and a rearward end 36, for placement along the upper back 14 of the torso 12 of the dog 10. Central strap 32 includes a forward segment 40 and a rearward segment 42, the two segments 40 and 42 being selectively joined together or separated by selective attachment means shown in the form of a central strap buckle 44 having selectively engagable and disengagable buckle elements 46 and 48. The forward segment 40 has an adjustable length by virtue of the adjustable engagement with buckle element 46 at 50 in a now conventional manner.

A forward strap assembly 52 is provided for affixing the forward end 34 of the central strap 32 to the torso 12 of the dog 10 adjacent the forelegs 20. Thus, forward strap assembly 52 includes a forward strap 60 extending transverse to the central strap 32 and attached to the central strap 32, adjacent forward end 34, as by stitching at 62. Forward securing means are shown in the form of a buckle 64 having selectively engagable and disengagable buckle elements 66 and 68 affixed to opposite ends of the forward strap 60 so that the opposite ends of forward strap 60 are selectively secured together to establish a forward loop 70 encircling the torso 12 adjacent the forelegs 20, forward of the forelegs 20, as seen in FIGS. 1 and 2. An intermediate strap 72 extends transverse to the central strap 32 and is attached to the central strap 32, adjacent forward strap 60, and between the forward strap 60 and the rearward end 36, as by stitching at 74. Intermediate securing means are shown in the form of a buckle 76 having selectively engagable and disengagable buckle elements 78 and 80 affixed to opposite ends of the intermediate strap 72 so that the opposite ends of intermediate strap 72 are selectively secured together to establish an intermediate loop 82 encircling the torso 12 adjacent the forelegs 20, rearward of the forelegs 20, as seen in FIGS. 1 and 2.

A rearward strap assembly 90 is provided for affixing the rearward end 36 of central strap 32 to the torso 12 of dog 10 adjacent the hind legs 24, along hind portion 28 of torso 12. Rearward strap assembly 90 includes a first rearward strap 92 extending transverse to the central strap 32 and attached to the central strap 32, adjacent the rearward end 36, as by stitching at 94. First rearward securing means are shown in the form of a buckle 96 having selectively engagable and disengagable buckle elements 98 and 100 affixed to the central strap 32 and to a remote end 101 of the first rearward strap 92, respectively, so that the remote end 101 of first rearward strap 92 is selectively secured to the central strap 32 to establish a first rearward loop 102 extending between one of the hind legs 24 and the abdomen 16, in this instance the one hind leg being the left hind leg 24L, as seen in FIGS. 1 and 2. A second rearward strap 104 extends transverse to the central strap 32 and is attached to the central strap 32, adjacent rearward end 36, as by stitching at 106. Second rearward securing means are shown in the form of a buckle 110 having selectively engagable and disengagable buckle elements 112 and 114 affixed to the central strap 32 and to a remote end 115 of the second rearward strap 104, respectively, so that the remote end 115 of second rearward strap 104 is selectively secured to the central strap 32 to establish a second rearward loop 116 extending between the other of the hind legs 24 and the abdomen 16, in this instance the other hind leg being the right hind leg 24R, as seen in FIG. 2.

A handle member 120 is provided at a rearward portion 122 of the central strap 32, located adjacent the rearward end 36 of the central strap 32. The handle member 120 is coupled with the rearward portion 122 of central strap 32 so as to enable grasping of the mobility aid 30 along the handle member 120, adjacent the rearward end 26 and along the back 14 of the dog 10, adjacent the hind legs 24. In this manner, a lifting force is applied to the dog 10 along the hind portion 28, at the back 14 adjacent the hind legs 24, for maximum effectiveness in assisting the dog 10 in standing and walking. The rearward loops 102 and 104 extend between the abdomen 16 and the respective hind legs 24L and 24R so as to assure that the lifting force is transmitted to the dog 10 with comfort as well as with maximum effectiveness and without injury. Maximum effectiveness is attained by locating the handle member 120 in the vicinity where support is required most, namely, along the torso 12 at the hind portion 28, adjacent the hind legs 24. In the preferred construction, handle member 120 is in the form of a rigid tube 124 coupled to the rearward portion 122 of central strap 32 by slipping the tube 124 over the rearward portion 122. An example of an effective mobility aid 30 includes a central strap 32 having a length between ends 34 and 36 of about thirty-two inches and a handle member 120 constructed of a rigid synthetic polymeric tube 124, such as a commonly available PVC pipe, having a length extending along a significant portion of the length of the central strap 32, and preferably along at least approximately one-fifth the length of the central strap 32. The segmented construction of the central strap 32 enables selective connection and disconnection at the buckle 44 for ease of applying and adjusting the mobility aid 30 to a particular animal.

Figure 4:
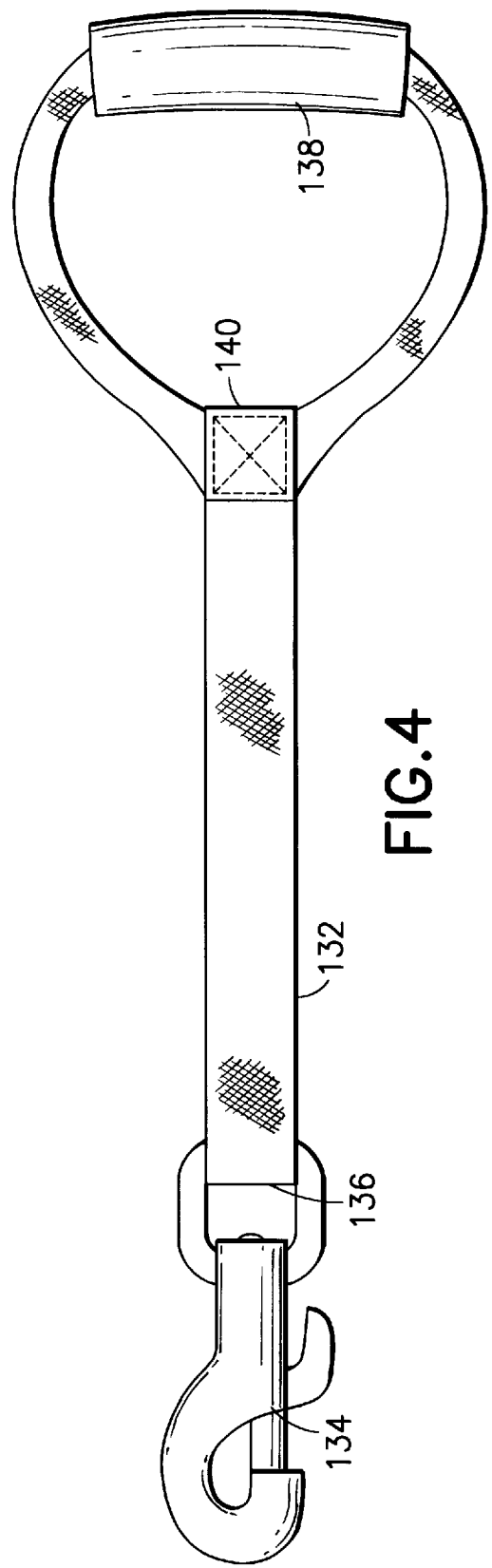
FIG. 4 is a plan view of an auxiliary lead used in connection with the pet animal mobility aid.

In order to provide further assistance during walking, an auxiliary ring 130 is attached to the central strap 32 adjacent the rearward end 36 of the central strap 32, between the rearward end 36 and the handle member 120 and an auxiliary lead 132, as illustrated in FIG. 4, is attached to the ring 130. Lead 132 includes a swivel-snap 134 for connecting end 136 of the lead 132 to the ring 130, and a handle 138 at end 140 of the lead 132. Attachment of the lead 132 at the rearward location of ring 130 enables the application of a lifting force at the position where most needed to assist a dog 10 experiencing difficulties in the vicinity of hind legs 24.

The straps 32, 60, 72, 92 and 104 each are constructed of a relatively flexible material, such as a nylon web belt material, which provides flexibility while maintaining stability in length and width. The length of each strap may be made selectively adjustable at a corresponding buckle element, in a conventional manner. A cushioning pad 150 may be slipped over each strap 32, 60, 72, 92 and 104 for added comfort and protection.

It will be seen that the present invention attains the several objects and advantages summarized above, namely: Provides a simple and highly effective device which is readily fitted onto a pet animal, such as a dog or a cat, having an infirmity which inhibits standing and walking movements for assisting in the handling of the animal; enables the animal to be assisted in standing and walking, with a device of minimal complexity and maximum effectiveness, and with ease of application and removal; provides increased versatility for use with animals having a wide range of sizes and configuration; enables assisted standing and walking without significantly interfering with the natural movements of the animal; provides support where needed most, and especially in the vicinity of the hind portion of the back of the animal, while enabling freedom of movement for maximum effectiveness with comfort and with minimal invasiveness; enables economy of manufacture and ease of maintenance; provides a rugged device readily manufactured of high quality materials for exemplary performance over an extended service life.

It is to be understood that the above detailed description of a preferred embodiment of the invention is provided by way of example only. Various details of design and construction may be modified without departing from the true spirit and scope of the invention, as set forth in the appended claims.

The embodiments of the invention in which an exclusive property or privilege is claimed are defined as follows:

1. A pet animal mobility aid for pet animals having a torso including a longitudinal length, an upper back, and a lower abdomen and having four legs, including two forelegs and two hind legs, the mobility aid comprising:

a relatively flexible central strap extending longitudinally between a forward end and a rearward end for placement along the upper back of the torso;

a forward strap assembly at the forward end of the central strap for affixing the forward end of the central strap to the torso adjacent the forelegs;

a rearward strap assembly for affixing the rearward end of the central strap to the torso along a hind portion of the upper back, adjacent the hind legs, the rearward strap assembly including a relatively flexible first rearward strap extending transverse to the central strap and attached to the central strap adjacent the rearward end of the central strap for establishing a first rearward loop extending from the central strap between one of the hind legs and the abdomen;

a relatively flexible second rearward strap extending transverse to the central strap and attached to the central strap adjacent the rearward end of the central strap for establishing a second rearward loop extending from the central strap between the other of the hind legs and the abdomen; and a handle member extending longitudinally along and coupled with at least a rearward portion of the central strap, the rearward portion being located adjacent the rearward end of the central strap, for placement along the hind portion of the upper back to enable grasping of the mobility aid along the handle member, adjacent the hind legs of the pet animal, to assist mobility of the pet animal.

2. The invention of claim 1 wherein the rearward strap assembly includes
   a first rearward securing means for securing the first rearward strap in the first rearward loop extending between the one of the hind legs and the abdomen; and
   a second rearward securing means for securing the second rearward strap in the second rearward loop extending between the other of the hind legs and the abdomen.

3. The invention of claim 2 wherein the forward strap assembly includes
   a relatively flexible forward strap extending transverse to the central strap and attached to the central strap adjacent the forward end of the central strap, for establishing a forward loop encircling the torso adjacent the forelegs, forward of the forelegs; and
   a relatively flexible intermediate strap extending transverse to the central strap and attached to the central strap adjacent the forward strap for establishing an intermediate loop encircling the torso adjacent the forelegs, rearward of the forelegs.

4. The invention of claim 3 wherein the forward strap assembly further includes
   forward securing means for securing the forward strap in the forward loop encircled about the torso forward of the forelegs;
   intermediate securing means for securing the intermediate strap in the intermediate loop encircled about the torso rearward of the forelegs.

5. The invention of claim 4 wherein the handle member comprises a relatively rigid tube, and the portion of the central strap extends through the tube.

6. The invention of claim 4 including a resilient pad placed on each of the forward strap, the intermediate strap and the first and second rearward straps.

7. The invention of claim 4 wherein each of the forward strap, the intermediate strap and the first and second rearward straps are constructed of a flexible web material.

8. The invention of claim 7 wherein the central strap is constructed of a flexible web material.

9. The invention of claim 4 wherein each of forward securing means, the intermediate securing means and the first and second rearward securing means includes a buckle affixed to a corresponding forward strap, intermediate strap, and first and second rearward strap.

10. The invention of claim 4 wherein the central strap includes a forward segment and a rearward segment, and a further securing means securing together the forward segment and the rearward segment.

11. The invention of claim 10 wherein the further securing means includes a buckle securing together the forward segment and the rearward segment for selective release of the forward segment from the rearward segment.

12. The invention of claim 10 wherein the handle member includes a forward end and a rearward end, and the mobility aid includes a supplemental handle attachment means located adjacent the rearward end of the handle member.

13. The invention of claim 12 wherein the supplemental handle attachment means includes a ring affixed to the central strap adjacent the rearward end of the handle member.

14. The invention of claim 1 wherein the handle member includes a forward end and a rearward end, and the mobility aid includes a supplemental handle attachment means located adjacent the rearward end of the handle member.

15. The invention of claim 14 wherein the rearward strap assembly includes
   a first rearward securing means for securing the first rearward strap in the first rearward loop extending between the one of the hind legs and the abdomen; and
   a second rearward securing means for securing the second rearward strap in the second rearward loop extending between the other of the hind legs and the abdomen.

16. A pet animal mobility aid for pet animals having a torso including a longitudinal length, an upper back, and a lower abdomen and having four legs, including two laterally opposite forelegs and two laterally opposite hind legs, the mobility aid comprising:
   a relatively flexible central strap extending longitudinally between a forward end and a rearward end for placement along the upper back of the torso, the central strap including laterally opposite sides;
   a forward strap assembly at the forward end of the central strap for affixing the forward end of the central strap to the torso adjacent the forelegs;
   a rearward strap assembly for affixing the rearward end of the central strap to the torso along a hind portion of the upper back, adjacent the hind legs, the rearward strap assembly including
      a relatively flexible first rearward strap extending from the central strap in a first lateral direction away from one of the opposite sides, transverse to the central straps and attached to the central strap adjacent the rearward end of the central strap for establishing a first rearward loop at said one of the opposite sides of the central strap such that the first rearward strap is adapted to be looped between one of the hind legs and the abdomen;
      a relatively flexible second rearward strap extending from the central strap in a second lateral direction away from the other of the opposite sides, transverse to the central strap, and attached to the central strap adjacent the rearward end of the central strap, the second lateral direction being opposite to the first lateral direction for establishing a second rearward loop at said other of the opposite sides of the central strap such that the second rearward strap is adapted to be looped between the other of the hind legs and the abdomen; and
   a handle member extending longitudinally along and coupled with at least a rearward portion of the central strap, the rearward portion being located adjacent the rearward end of the central strap, for placement along the hind portion of the upper back to enable grasping of the mobility aid along the handle member, adjacent the hind legs of the pet animal, to assist mobility of the pet animal.

17. The invention of claim 16 wherein the forward strap assembly further includes
   forward securing means for securing the forward strap in the forward loop encircled about the torso forward of the forelegs; and
   intermediate securing means for securing the intermediate strap in the intermediate loop encircled about the torso rearward of the forelegs.

18. The invention of claim 17 wherein the supplemental handle attachment means includes a ring affixed to the central strap adjacent the rearward end of the handle member.

* * * * *

UNITED STATES PATENT AND TRADEMARK OFFICE
CERTIFICATE OF CORRECTION

Page 1 of 2

PATENT NO. : 5,845,606
DATED : December 8, 1998
INVENTOR(S) : Mary E. Hartman

It is certified that error appears in the above-identified patent and that said Letters Patent is hereby corrected as shown below:

Column 4, line 39, after "two" insert --laterally opposite--;
        line 40, after "two" insert -- laterally opposite--;
        line 43, after "torso" insert --, the central strap including laterally opposite ends--;
        line 51, after "extending" insert --from the central strap in a first lateral direction away from one of the opposite sides,--;
        line 54, delete "extending from" and insert --at said one of the opposite sides of--;
        line 55, after "strap" insert --such that the first rearward strap is adapted to be looped--;

UNITED STATES PATENT AND TRADEMARK OFFICE
CERTIFICATE OF CORRECTION

PATENT NO. : 5,845,606
DATED : December 8, 1998
INVENTOR(S) : Mary E. Hartman

It is certified that error appears in the above-identified patent and that said Letters Patent is hereby corrected as shown below:

line 57, after "extending", insert --from the central strap in a second lateral direction away from the other of the opposite sides--;

line 60, after "strap" insert --the second lateral direction being opposite to the first lateral direction--;

lines 60-61, delete "extending from" and insert --at said other of the opposite sides of--;

line 61, after "strap" insert --such that the second rearward strap is adapted to be looped--.

Signed and Sealed this

Twenty-ninth Day of June, 1999

Attest:

Q. TODD DICKINSON

Attesting Officer     Acting Commissioner of Patents and Trademarks